United States Patent [19]

Kurrle

[11] Patent Number: 4,794,851
[45] Date of Patent: Jan. 3, 1989

[54] NOZZLE MEANS FOR AN AIR CONDITIONING INSTALLATION

[75] Inventor: Hermann Kurrle, Kolbingen, Fed. Rep. of Germany

[73] Assignee: Schako Metallwarenfabrik Ferdinand Schad KG, Tuttlingen, Fed. Rep. of Germany

[21] Appl. No.: 48,589

[22] Filed: May 11, 1987

[30] Foreign Application Priority Data

May 14, 1986 [DE] Fed. Rep. of Germany ... 8613078[U]

[51] Int. Cl.⁴ .......................................... F24F 13/065
[52] U.S. Cl. ................................... 98/40.18; 98/40.02
[58] Field of Search ................ 98/40.02, 40.05, 40.11, 98/40.18

[56] References Cited

U.S. PATENT DOCUMENTS 3,942,419 3/1976 Beach .................................. 98/40.02

FOREIGN PATENT DOCUMENTS 2830363 1/1980 Fed. Rep. of Germany ..... 98/40.18
363152 12/1931 United Kingdom ............... 98/40.18

Primary Examiner—Harold Joyce
Attorney, Agent, or Firm—Antonelli, Terry & Wands

[57] ABSTRACT

In a nozzle for an air conditioning installation or the like for ventilating rooms, having a mounting frame with an opening and a nozzle pivotably mounted therein and which has an extension part with a contour substantially closing the opening, the extension part is a widened extension region constructed in one piece with the nozzle, which leads to manufacturing advantages and wider possibilities of use.

4 Claims, 1 Drawing Sheet

NOZZLE MEANS FOR AN AIR CONDITIONING INSTALLATION

BACKGROUND OF THE INVENTION

The invention relates to a nozzle means for an air conditioning installation or the like for the ventilation of rooms, having a mounting frame with an opening and a nozzle pivotably mounted therein, which has an extension with a contour substantially closing the opening.

A nozzle means of the aforementioned type is disclosed in, for example, DE-OS No. 31 24 876. The known nozzle means has a nozzle pivotably inserted in a mounting frame and which over most of its axial extension has a diameter which is much smaller than the diameter of an opening of the mounting frame. The nozzle is held in the mounting frame, in that it is fixed to a cup which partly surrounds it and is held in the opening of the mounting frame, the latter having a frame-like ring flange adapted to the cup shape and directed outwards from the plane of its cover plate. This ring flange holds the cup, so that the nozzle can be correspondingly pivoted. This construction is not only complicated, but as a result of the complicated swivel mounting of the nozzle fault-prone, so that problems can occur during pivoting. Moreover, unless the nozzles are separately secured, they can move out of a set position, while an additional securing means is complicated due to the ball guide and possibly disfigures the mounting frame.

The aim underlying the present invention essentially resides in providing a nozzle means of the aforementioned type, which offers possibilities of much more varied use due to the advantageous construction from the manufacturing and material standpoints.

SUMMARY OF THE INVENTION

In the case of a nozzle means of the aforementioned type, according to the present invention the extension is a widened extension region constructed in one piece with the nozzle. Whereas in the known nozzle means it is necessary to provide, apart from the mounting frame and the actual nozzle, an additional nozzle-surrounding cup, as well as optionally a counter-mounting part, while the mounting frame also had to be constructed in a complicated manner, the inventive nozzle means only comprises the nozzle and the mounting frame. Thus, the nozzle is itself constructed in one piece and extended in such a way that the extension region largely covers the mounting frame opening, but the nozzle can still be adequately pivoted or swivelled.

Whereas, in the prior art it was necessary to directly mount the cup, according to a further development of the present invention the nozzle is articulated in the extension region by two swivel holders fixed to the frame. Thus, compared with the pivoting possibilities with the cup mounting limited by the proportion of the cup with respect to the overall ball, this construction permits a greater swivel or pivoting angle than was possible with the pivoting nozzle according to the prior art. Due to the greater pivoting possibilities, there is the advantage of covering a much larger surface than was the case in the prior art. Another advantage is that in the invention only one nozzle body has to be used, whereas, with the known pivotable nozzles two bodies were provided and consequently there was a risk of suspended matter penetrating and becoming deposited between the bodies, so that the nozzle would not then function in a completely satisfactory manner.

According to a further development of the present invention up to just below the cover plate of the mounting frame, the nozzle has a much smaller diameter than the opening and is only then extended to the contour substantially corresponding to the mounting frame opening. In the basic position in the extended region below the frame, the nozzle contour is located within a cup contour closing the opening and formed round the centre of the pivot axis. Thus, despite the one-piece construction of the overall swivel nozzle and the ensuring of its pivoting possibility in the mounting frame while substantially covering the opening of the latter in all swivelling positions, it is still ensured that the actual nozzle region tapering towards its front end is sufficiently long to achieve an adequate nozzle effect and, in particular, an optimum projecting range. It is possible to shorten the conical portion in known manner in a plane at right angles to the nozzle axis and in the front region thereof, so that for a given injection pressure the nozzle can be adapted to the desired throughput quantity and/or pipe width. In particular, the nozzle starts to widen from its region having a smaller diameter than that of the mounting frame opening at a distance from the plane of the mounting frame cover plate which corresponds substantially to the vertical spacing of the swivel axis from the cover plate.

The swivel holders are constructed as angle brackets arranged on the cover frame and are either welded or constructed in one piece with the cover frame.

According to a further development of the present invention a whirl-producing grid is inserted in the inner part of the nozzle and, in particular, in an inlet frame constructed thereon. The rotation produced by the grid is increased by passing through the conical nozzle region, so that there is a reduction in the projecting range compared with a construction without a grid. If there is not only to be a permanent setting of the nozzle alignment and instead it can be modified after installation, e.g. as a function of whether hot or cold air is to be supplied, then the nozzle can be connected to a motor pivot drive for pivoting its pivot axis or shaft. If the nozzle is e.g. located in the upper region of a wall, e.g. on introducing cold air it can be pivoted into an upper position, whereas, on supplying hot air is can be pivoted into a downwardly directed position. In the upper position, the outflowing cold air jet engages with the ceiling and is guided by the latter until the air has distributed in such a way that it no longer causes a draft in the room. However, on introducing the air, it is possible to have a high throughput quantity and a high discharge speed and consequently a large projecting range into the room. In the downwardly directed position, heated air can be directly supplied to the desired point, without drafts occurring. If necessary, it is also possible to juxtapose several similar nozzles in a duct, e.g. by a common holding frame.

BRIEF DESCRIPTION OF THE DRAWINGS

The invention is described in greater detail hereinafter relative to a non-limitative embodiment and the attached drawings, wherein show.

DETAILED DESCRIPTION OF THE INVENTION

Figure 2:
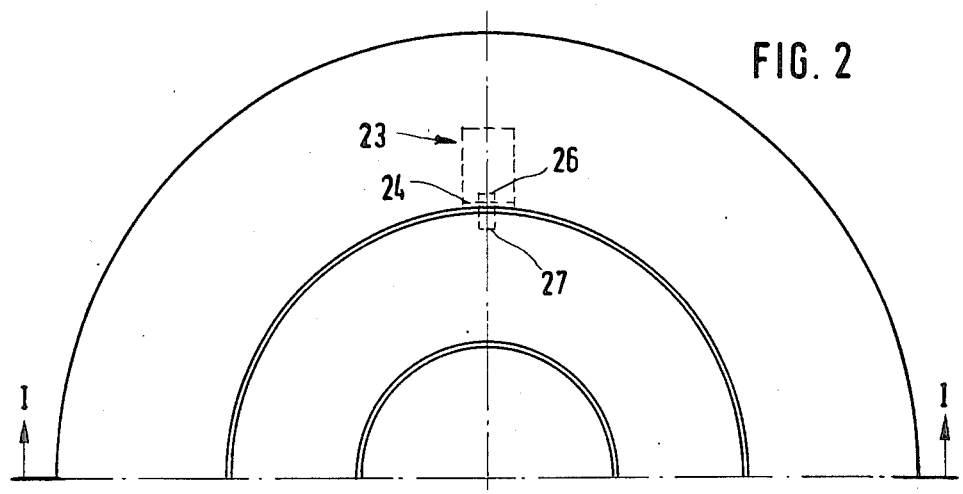
FIG. 2, a view from below in accordance with arrows II—II of FIG. 1, whereby as a result of symmetry only half the nozzle means is shown.

The inventive nozzle means generally designated by the reference numeral 1 has a mounting frame generally designated by the reference numeral 2, which is circular symmetrical in the represented embodiment. The mounting frame 2 has a cover plate 3 and a ring flange 4 on its outer circumference. By the mounting frame 2, the nozzle means 1 can be installed in the manner apparent from FIG. 1 in an opening generally designated by the reference numeral 6 in a ceiling or wall 7, with the angular position of the frame 2 therein, particularly in the case of the represented circular configuration being selectable in a random, appropriate manner.

In the cover plate 3, the mounting frame 2 has a circular opening generally designated by the reference numeral 8, through which extends the actual nozzle 9. Nozzle generally designated by the reference numeral 9 is substantially constituted by a nozzle casing generally designated by the reference numeral 11 from the same material as mounting frame 2, preferably metal, which can be varnished, but can also be made from plastic. Nozzle jacket 11 has a conical nozzle portion 12, which tapers towards its outer end generally designated by the reference numeral 13 and can be optionally be cutoff for modifying the throughput quantity and/or range of the nozzle for a given injection pressure in a plane 14 at right angles to nozzle axis 16, as shown with respect to the nozzle 9 in the drawings by the part indicated in broken line manner.

To the conical nozzle portion 12 is connected a shoulder-like extension 17 which, with respect to the conical configuration in the represented basic position, starts at a distance from cover plate 3 of mounting frame 2 roughly corresponding to the vertical spacing of the pivot point 18 of the nozzle 9 relative to the mounting frame 2. The diameter of the widening or extending shoulder region 17 in the plane of cover plate 3 is slightly smaller than the diameter of opening 8 of the mounting frame 2 and which is e.g. 1 to 3 mm. To the shoulder region 17 is connected a substantially cylindrical extension region of nozzle casing 11, whose diameter roughly corresponds to the diameter of opening 8 of mounting frame 2. In the illustrated embodiment is connected to the extension region 19 by a further small shoulder 21, an inlet frame 22 having a constant diameter, which is constructed in one piece with the further nozzle regions and the cut off.

Angle brackets are fixed as pivot holders generally designated by the reference numeral 23 to the inside of cover plate 3 of mounting frame 2, e.g. when using metal for both the mounting frame 2 and brackets or holdus 23. The latter can also be constructed in such a way that during the manufacture of mounting frame 2, flaps are left when punching out the opening 8 in the opening region and they are subsequently bent out of the plane of cover plate 3 with a leg 24 thereof inwards into the frame 2. When made from plastic, instead of being welded the angle brackets or holders 23 can also be jointly injection moulded in one piece onto frame 2. In the illustrated embodiments the angle brackets or holders 23 are provided in the leg 24, in the same way as nozzle 9 in extension region 19 with diagonally facing holes, through which pass rivets 27, by which the nozzle 9 is pivotable articulated to the mounting frame 2 about the pivot axis 18 defined by the rivets 27.

When the plastic is used, the above construction can be replaced by the leg 24 and/or nozzle 9 having projections with undercuts through radially extending noses provided on the tip thereof and which engage in a hole 26 of the other part until its circumferential edge overcomes the undercut, so that in this way the nozzle 9 is pivotably held in the frame 2. As a result of its elasticity, the plastic legs 24 can pivot back during assembly, so after the attachments have entered the openings of the other part, the legs 24 can also closely engage therewith.

Figure 1:
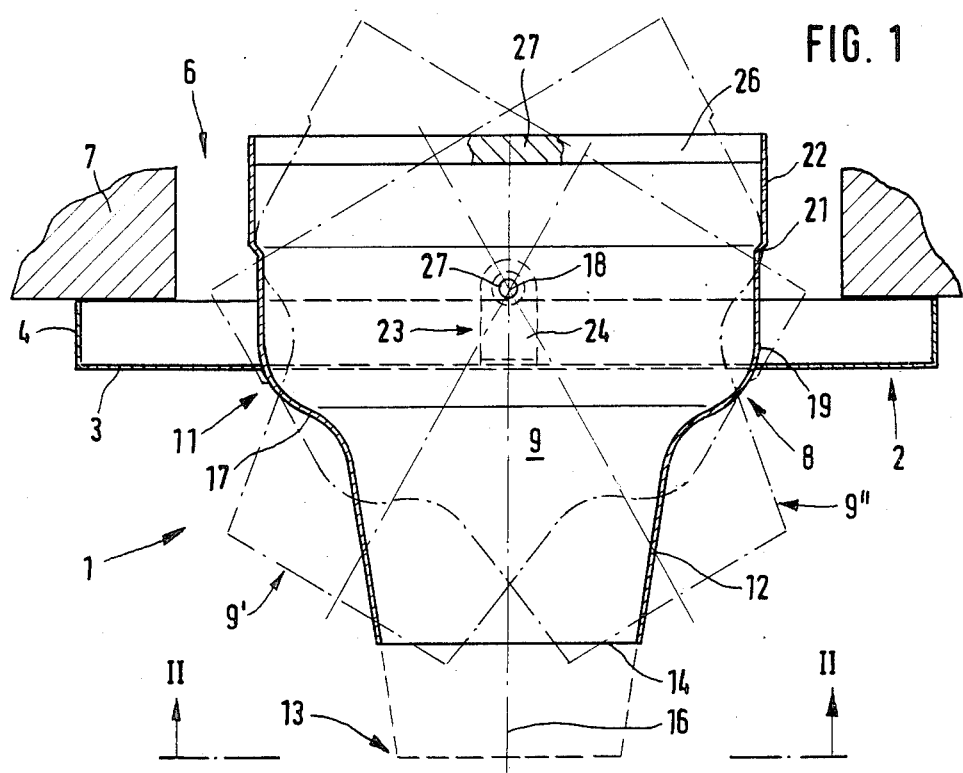
FIG. 1, a sectional view through the nozzle means according to the invention.

The nozzle 9 can be pivoted into positions generally designated by the reference numerals 9′ and 9″ indicated by dot-dash lines in FIG. 1. Due to the inventive construction, the pivot region is larger than in the case of a nozzle 9 held directly in the mounting frame opening 8 by a cup part, in the case of an identical positioning of the fictional pivot axis, because, at least in the simple, one-piece construction, the cup cannot extend beyond a hemisphere and, consequently, its pivot region is limited. Moreover, the inventive construction is simpler and less costly than known constructions, so that it can, in many cases, be used more advantageously than previously. As a result of its described contour and particularly the fact that the widened shoulder region 17 and extension region 19 are set back towards the edge of opening 8 with respect to the contour of a fictional cup formed around the pivot axis 18, the nozzle 9 has good projecting characteristics, particularly over long distances.

In the inlet frame 22 of FIG. 1 is provided a whirl-producing grid 26 having sheet-metal guides or webs 27 inclined in the direction of axis 16. Through the choice of the slope of the sheet-metal guide 27, it is possible to adjust the intensity and whirling effect of the air jet passing out of the nozzle 9 and, consequently, the projection range within wide limits.

What is claimed is:

1. A nozzle means for an air conditioning installation or the like for ventilating rooms, the nozzle means comprising:
    a circular mounting frame including a cover plate having a ring flange on an outer circumference thereof;
    a circular opening provided in the cover plate of the circular mounting frame;
    a nozzle extending through the circular opening, with the nozzle including a nozzle jacket, said nozzle jacket having a conical nozzle portion tapering toward an outer end thereof and being adapted to be cut-off;
    a shoulder-like region connected to the conical nozzle portion, said shoulder-like region beginning with respect to the conical nozzle portion at a distance from the cover plate of the mounting frame roughly corresponding to a vertical spacing of a pivot point of the nozzle relative to the mounting frame, a diameter of the shoulder-like region in a plane of the cover plate slightly less than a diameter of the opening of the mounting frame;
    a substantially cylindrical extension region of the nozzle casing is connected to the shoulder region, with a diameter of a substantially cylindrical extension region substantially corresponding to a diameter of the circular opening of the cover plate;
    pivot holding means are fixed to an inside of the cover plate and are formed as legs extending in the same direction as the nozzle in the extension region of the nozzle casing, with diagonally facing holes being provided in the pivot holder means for accommodating pivot means for enabling the nozzle to be pivotably mounted to the mounting frame about the pivot point defined by the pivot means.

2. A nozzle means according to claim 1, wherein the pivot holder means are welded to the cover plate.

3. A nozzle means according to claim 1, wherein the pivot holder means are punched out as one piece flaps of the mounting frame bent out of a plane of the cover plate inwardly into the frame.

4. A nozzle means according to one of claim 3, wherein an inlet frame is provided with a whirl-producing grid means having sheet metal guide means inclined relative to an axis of symmetry of the nozzle.

* * * * *